United States Patent [19]
Loewenstein et al.

[11] Patent Number: 5,102,231
[45] Date of Patent: Apr. 7, 1992

[54] SEMICONDUCTOR WAFER TEMPERATURE MEASUREMENT SYSTEM AND METHOD

[75] Inventors: Lee M. Loewenstein, Plano; John D. Lawrence, Dallas; Wayne G. Fisher, Allen; Cecil J. Davis, Greenville, all of Tex.

[73] Assignee: Texas Instruments Incorporated, Dallas, Tex.

[21] Appl. No.: 647,085

[22] Filed: Jan. 29, 1991

[51] Int. Cl.⁵ .................................................. G01J 5/54
[52] U.S. Cl. ...................................... 374/129; 356/43; 356/358
[58] Field of Search .................. 374/123, 129, 133; 356/43, 46, 47, 349, 358

[56] References Cited

U.S. PATENT DOCUMENTS

| | | | |
|---|---|---|---|
| 3,632,212 | 1/1972 | Bernal | 374/123 |
| 4,375,164 | 3/1983 | Dodge et al. | 356/44 |
| 4,818,102 | 4/1989 | Glenn | 356/43 |
| 4,841,150 | 6/1989 | Walter | 356/43 |
| 4,918,492 | 4/1990 | Ferdinand et al. | 356/43 |
| 4,919,542 | 4/1990 | Nulman et al. | 374/133 |
| 4,948,958 | 8/1990 | Sweeney | 374/123 |
| 4,973,853 | 11/1990 | Leonard et al. | 356/43 |
| 4,979,134 | 12/1990 | Arima et al. | 374/126 |
| 4,984,903 | 1/1991 | Sweeney | 374/129 |

OTHER PUBLICATIONS

Kaufman, Y. et al., "Simultaneous heating and temperature measurements by an infrared laser beam," Applied Optics, vol. 15, No. 2, pp. 353–357 (Feb. 1976).

Primary Examiner—William A. Cuchlinski, Jr.
Assistant Examiner—Diego F. F. Gutierrez
Attorney, Agent, or Firm—Ira S. Matsil; James C. Kesterson; Richard L. Donaldson

[57] ABSTRACT

A system for measuring the temperature of a semiconductor wafer 12 comprises a light source 14, a photodetector 20 which is operable to determine light intensity, and a mirror 18 in a predetermined fixed position from a beam splitter 16. The components are positioned such that light from the light source 14 impinges the beam splitter 16 and subsequently reflects off the mirror 18 and the wafer 12 and is received by the photodetector 20. Changes in the temperature of the wafer 12 are calculated based upon changes in the intensity of the received light which depends upon the expansion/contraction of the wafer. The absolute temperature may be calculated based on a known reference temperature and the changes in wafer 12 temperature. A second system and method for measuring the temperature of a semiconductor wafer which includes the use of a plurality of mirrors and two beam splitters is also disclosed.

21 Claims, 2 Drawing Sheets

SEMICONDUCTOR WAFER TEMPERATURE MEASUREMENT SYSTEM AND METHOD

NOTICE (C) Copyright, *M* Texas Instruments Incorporated 1991. A portion of the disclosure of this patent document contains material which is subject to copyright and mask work protection. The copyright and mask work owner has no objection to the facsimile reproduction by anyone of the patent document or the patent disclosure, as it appears in the Patent and Trademark Office patent file or records, but otherwise reserves all copyright and mask work rights whatsoever.

FIELD OF THE INVENTION

This invention generally relates to the fabrication of semiconductor devices and specifically to a method and apparatus for measuring the temperature of a semiconductor wafer.

BACKGROUND OF THE INVENTION

During the fabrication of semiconductor devices, it is often advantageous to accurately measure the temperature of the device being processed. One method of temperature measurement is to use a thermocouple in contact with the surface which needs to be measured. Another contact measurement technique utilizes a phosphorescent sensor.

However, the standard contact measurement technique is not suitable due to possible metal contamination of the semiconductor material at the point of contact and subsequent diffusion of such contaminants throughout the wafer. In addition, attachment of a thermocouple leads to "shadowing" of the wafer to the incoming radiation, and also a perturbation of its own radiation and internal heat transfer.

Non-contact measurement techniques such as pyrometry may also be used. This technique, however, is of limited usefulness for semiconductors. A serious drawback is that at temperatures below approximately 700° to 800° C., significant amounts of radiation pass from the heating lamps through the wafer to the pyrometric detector and thus interfere with the measurement of the wafer temperature. In addition, the emissivity of a silicon surface, upon which temperature determination by pyrometry is based, varies with temperature, doping level and film deposition. These variations lead to inaccurate temperature assignment.

Accordingly, improvements which overcome any or all of the problems are presently desirable.

SUMMARY OF THE INVENTION

Other objects and advantages will be obvious, and will in part appear hereinafter and will be accomplished by the present invention which provides a method and apparatus for measuring the temperature of a semiconductor wafer.

One embodiment of the present invention discloses a temperature measurement system which comprises a light source, possibly a laser, a photodetector, a fixed mirror, and a beam splitter. The components are configured such that light from the light source travels through the beam splitter and subsequently reflects off the mirror and the wafer and is received by the photodetector. Changes in the intensity of the light received by the photodetector correspond to changes in the temperature of the wafer by exploiting the properties of thermal expansion of the semiconductor material. By measuring the absolute temperature at one point in time, the absolute temperature of the wafer may be determined based on the changes in wafer temperature. Alternate embodiments and methods of use are also disclosed.

An advantage of the invention is that the technique is non-contacting with respect to the wafer and therefore device contamination problems are avoided. The present invention is also useful at all temperatures. Another advantage is that the technique of the present invention depends on a bulk property, namely thermal expansion, of the material and therefore variations such as doping or emissivity do not perturb the results.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

The making and use of the presently preferred embodiments are discussed below in detail. However, it should be appreciated that the present invention provides many applicable inventive concepts which can be embodied in a wide variety of specific contexts. The specific embodiments discussed are merely illustrative of a specific way to make and use the invention, and do not delimit the scope of the invention.

Figure 1:
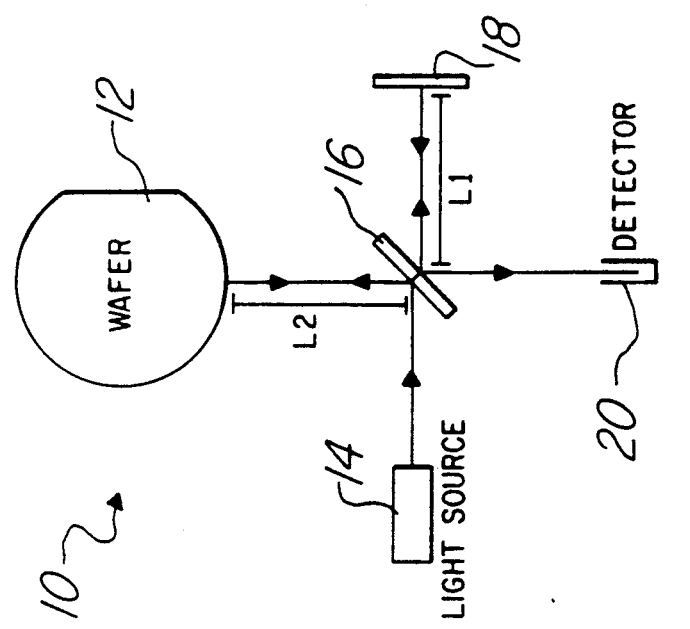
FIG. 1 is a diagram of a first embodiment of the present invention.

Referring first to FIG. 1, a measurement apparatus 10 of the first preferred embodiment is disposed in a processing chamber. A semiconductor wafer 12, a light source 14, a beam splitter 16, a mirror 18 and a photodetector 20 comprise the components of the first preferred embodiment. The mirror 18 is fixed in position.

The light source 14, for example a helium-neon laser which produces 632.8 nm light, is positioned such that transmitted light will impinge upon the beam splitter 16 and divide into two light beams which are in turn reflected to the wafer 12 and transmitted to the fixed mirror 18. The positions of the wafer 12 and the fixed mirror 18 may be reversed with similar results. The light will then reflect back from both the wafer 12 and the mirror 18 and be reflected or transmitted to the photodetector 20.

The preferred choice for the light source 14 is a laser; however, a non-coherent source will also work. The choice of material to form the mirror 18 and splitter 16 depends on the wavelength of the light. For example, the mirror 18 may be formed from aluminum or quartz while the splitter 16 is formed from quartz. Other materials, known in the art, will also be sufficient. The photodetector 20 may be one of a number of known photodetectors such as a photodiode.

The operation of the apparatus of the present invention is similar the operation of a Michelson interferometer, which is well known in the current art. The variable length L2 from the wafer 12 to the beam splitter 16 can be compared to the fixed length L1 from the fixed position mirror 18 to the beam splitter 16. By examining the changes of fringes resulting from successive constructive and destructive interference of monochromatic light, a very accurate measure of the change in length of L2 may be obtained.

As is well known in the art, the temperature of a semiconductor will directly affect the expansion/contraction of the material and therefore effect the size. Accordingly, as the wafer temperature changes, the diameter and thickness also change resulting in a change in the length of the light path. The thermal changes in the wafer can be measured either in the thickness (i.e., top or bottom surface) or in the diameter (i.e., a side edge surface). However, the thermal expansion in a given direction is proportional to the length in that direction. Therefore, the largest length change in a semiconductor wafer will be in its diameter, not its thickness. For typical 100 mm silicon wafers, there is a factor of 200 advantage in resolution by measuring diameter changes as opposed to thickness changes.

Therefore, by measuring changes in the length of the variable light path L2 the thermal expansion of the wafer 12 may be quantified and consequently changes in the temperature of the wafer 12 determined. In other words, changes in the intensity of the reflected light will be proportional to changes in the temperature of the wafer.

Figure 3:
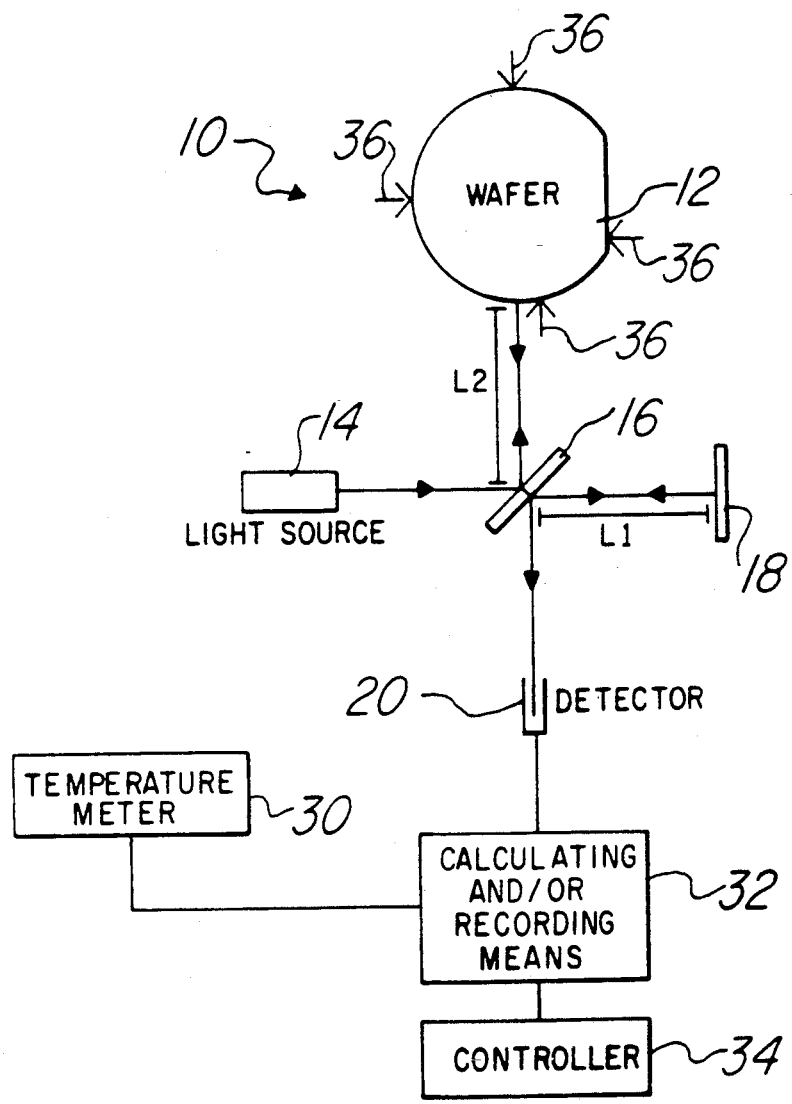
FIG. 3 is a diagram of a first embodiment system.

Referring to FIG. 3, to measure the absolute temperature of the wafer 12 a reference temperature should be provided by a conventional means 30 such as a thermocouple or thermistor. This means 30 for determining a reference temperature may be located somewhere where the reference temperature may be measured. If the wafer starts at room temperature, the initial temperature, i.e., the reference temperature may be assumed to be about 20° C. or 25° C. The accuracy of the absolute temperature of the wafer will then depend upon the accuracy of the room temperature reference measurement. Based upon the reference temperature, the absolute temperature of the wafer may be determined from the reference temperature along with changes in temperature which are calculated as described above.

The application of the technique described above can be enhanced by first polishing the edges of the wafer 14 prior to reflecting light from it. Typically, the wafer 14 edges are rounded and grainy. A simple polishing operation can provide a substantially improved surface for the specular reflection of light. Of course, if the measurements are made relative to the already polished top surface, this extra operation is not needed.

In addition, means for calculating and/or recording the temperature measurements 32 may be connected to the detector 20. These recording means may be as simple as a display from which a human transcribes the measurements or as complex as a digital computer which records and analyzes the measurements and in turn controls processing conditions such as chamber temperature or etch times, for example. The complexity and function of the recorder are a matter of design choice. A controller 34, as described above, is also schematically illustrated in FIG. 3.

The embodiment described with relation to FIG. 1 has one primary disadvantage. Perturbations of the wafer's position resulting from vibration or other unpredictable events will cause an error in temperature measurement. One solution is to secure the wafer 12, with securing means 36 such as a spring loaded mechanism for example. Alternately, a second preferred embodiment which substantially reduces this positional error is shown in FIG. 2.

Figure 2:
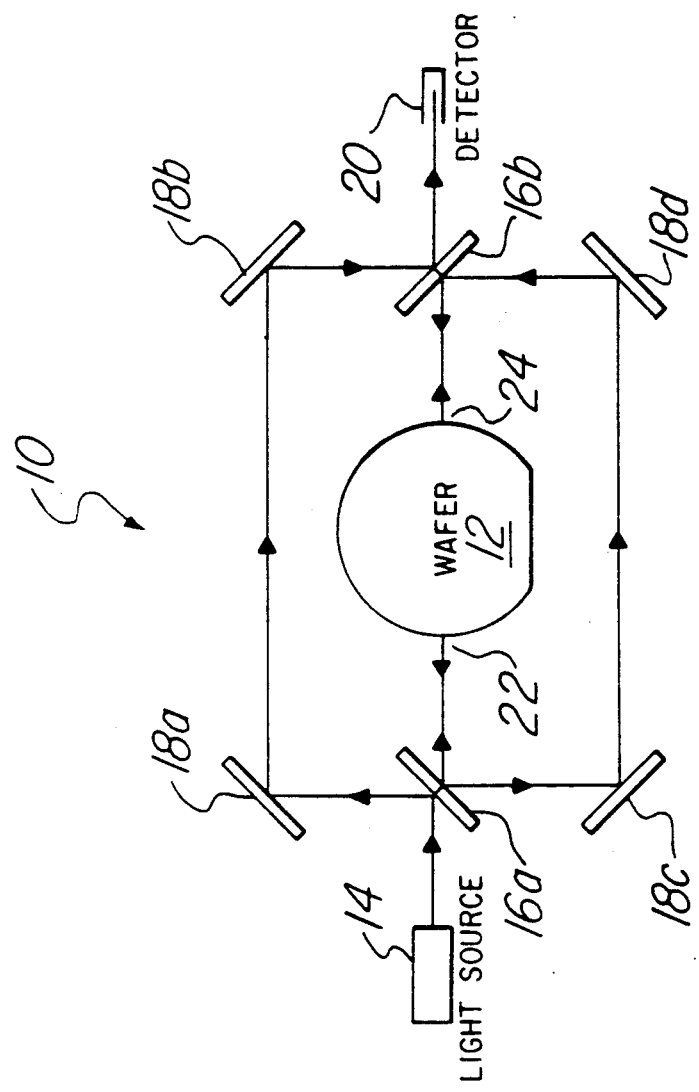
FIG. 2 is a diagram of a second embodiment of the present invention.

Referring to FIG. 2, an alternate scheme is presented in which the light is reflected twice, possibly off of diametrically opposed sides of the wafer for example. In the embodiment shown, two beam splitters 16a and 16b are configured along with four fixed position mirrors 18a-18d.

Light from light source 14 is reflected off of splitter 16a, mirrors 18a and 18b and splitter 16b and towards photodetector 20. Simultaneously, light from light source 14 is transmitted through splitter 16a and towards wafer 12 where it reflects off a first position 22 on wafer 12. The light then reflects off of splitter 16a, mirrors 18c and 18d and splitter 16b and travels towards a second position 24 on wafer 12. The light reflects from position 24 on wafer 12 and is transmitted through splitter 16b and towards detector 20.

As is known in the art, variations in the number of mirrors and angles of reflection and transmission are possible with like results achieved.

The operation of the system in FIG. 2 is analogous to the operation described with respect to FIG. 1 except now the thermal expansion is measured in two positions. As such, an error resulting from a change which effects both positions on the wafer, i.e., a displacement of the entire wafer, can be eliminated from the calculation of temperature. In addition, a means for securing the wafer from displacement in the direction orthogonal to the measurement light path may be implemented to avoid resultant errors. The wafer may also be rotated such that the light impinges the flat side surface in one position. This modification will further reduce positional errors.

The value of the approach shown in FIG. 2 is that small perturbations of the wafer position toward or away from the light source will not result in temperature measurement errors. Only true increases in wafer diameter due to temperature expansion will be measured. The disadvantage of this method is larger number of mirrors and splitters. Clearly, the embodiment of FIG. 2 would be more complex to set up than the embodiment of FIG. 1. Therefore, a design trade-off must be determined based on the needs of each specific application.

For either of the arrangements shown in FIG. 1 or FIG. 2, temperature changes of one degree Celsius would result in a path length change of $2.5 \times 10^{-5}$ cm for a 100 mm silicon wafer. With the 632.8 nm light from a He-Ne laser, one possible choice for the light source, a temperature change of 2.53° C. would cause one complete fringe shift. Thus, the ability to measure approximately one half of a fringe would allow for the temperature measurement to be precise to approximately one degree Celsius. Of course, the present invention could also be used for measuring the temperature of other semiconductor materials such as gallium arsenide.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system to measure changes in the temperature of a semiconductor wafer comprising:
 a semiconductor wafer in a first position from a beam splitter;
 a light source;
 a photodetector operable to determine light intensity;
 a mirror in a predetermined substantially fixed position from said beam splitter;
 said beam splitter positioned such that light from said light source impinges said beam splitter so as to direct light to both of said mirror and said wafer such that said directed light is reflected off of said mirror and off of said wafer and is subsequently received by said photodetector, and such that the intensity of said received light depends substantially upon the expansion/contraction of said wafer with respect to said first position; and
 means for calculating a change in the temperature of said wafer based on the intensity of said received light as determined by said photodetector.

2. The system of claim 1 and further comprising means for determining a reference temperature at a point in time so that the absolute temperature of said wafer may be determined from said reference temperature and said change in the temperature of said wafer.

3. The system of claim 1 wherein said wafer is positioned to reflect light from the edge of said wafer.

4. The system of claim 1 wherein said light source comprises a laser.

5. The system of claim 1 wherein said semiconductor wafer comprises silicon.

6. The system of claim 1 and further comprising means for securing said wafer.

7. The system of claim 1 and further comprising means for recording said changes in wafer temperature.

8. The system of claim 7 and further comprising means for controlling a process based on said wafer temperature.

9. A system to measure the temperature of a semiconductor wafer comprising:
 a semiconductor wafer in a first position from first and second beam splitters;
 a light source;
 a photodetector operable to determine light intensity;
 a plurality of mirrors each in a predetermined, substantially fixed position from said first and second beam splitters; and
 said first and second beam splitter positioned such that a first portion of light from said light source impinges said first beam splitter and is directed toward and reflected from a first position on said wafer and then subsequently reflects off said mirrors and impinges said second beam splitter and reflects off a second position on said wafer and subsequently is received by said photodetector, and simultaneously a second portion of light from said light source impinges said first beam splitter and is directed by other ones of said mirrors and said second beam splitter so as to be received by said photodetector, such that the intensity of said light received by said photodetector depends substantially upon the expansion/contraction of said wafer with respect to said first position; and
 circuitry for calculating a change in the temperature of the wafer based a change in the intensity of said first and second portions of received light.

10. The system of claim 9 and further comprising means for determining the absolute temperature at a point in time so that said means for calculating a change in temperature comprises means for calculating the absolute temperature of said wafer.

11. The system of claim 9 wherein said wafer is positioned to reflect light from the edge of said wafer.

12. The system of claim 11 wherein said mirrors and said wafer are positioned such that said first portion of light reflects off two diametrically opposed points on said wafer.

13. The system of claim 9 wherein said light source comprises a laser.

14. The system of claim 9 and further comprising means for securing said wafer.

15. A method for measuring a change in the temperature of a semiconductor wafer comprising:
 providing a semiconductor wafer in a first position from a beam splitter;
 shining light at said beam splitter which splits said light into a first and second beam wherein said first beam travels toward said wafer and said second beam travels towards a predetermined, substantially fixed position mirror;
 reflecting said first beam from a first position of said wafer and reflecting said second beam from said mirror such that said first and second reflected beams travel towards a photodetector operable to determine light intensity and wherein the intensity of said first and second reflected beams depends substantially upon the expansion/contraction of said wafer with respect to said first position;
 receiving said first and second reflected beams at said photodetector; and
 calculating a change in the temperature of said wafer based on the intensity of said first and second received beams.

16. The method of claim 15 and further comprising the step of measuring a reference temperature of said wafer prior to calculating a change in the temperature so that the absolute temperature of said wafer may be determined from said reference temperature and said change in the temperature of said wafer.

17. The method of claim 15 wherein said step of reflecting said first beam comprises reflecting said first beam from a position of the side of said wafer.

18. The method of claim 17 and further comprising the step of polishing the side of said wafer prior to reflecting light.

19. The method of claim 15 and further comprising the step of recording the temperature of said wafer subsequent to calculating the temperature.

20. A method for measuring a change in the temperature of a semiconductor wafer comprising:
 providing a semiconductor wafer in a first position from first and second beam splitters;
 shining light at said first beam splitter which splits said light into a first and second beam wherein said first beam travels toward and reflects from a first position on said wafer and subsequently reflects off of at least one mirror and impinges said second beam splitter and reflects off of a second position on said wafer and is directed towards a photodetector, and simultaneously said second beam travels towards at least one predetermined, substantially fixed position mirror and is subsequently reflected towards said photodetector;

receiving said first and second reflected beams at said photodetector wherein the intensisty of said received beams depends substantially upon the expansion/contraction of said wafer with respect to said first position; and calculating a change in the temperature of said wafer based on the intensity of said first and second received beams.

21. The method of claim 20 wherein said second position on said wafer is diametrically opposed to said first position on said wafer.

* * * * *